Patented June 18, 1940

2,204,565

UNITED STATES PATENT OFFICE 2,204,565

PREPARATION OF CYCLOHEXENE

Edgar C. Britton, Robert C. Dosser, and John J. Sculati, Midland, Mich., assignors to The Dow Chemical Company, Midland, Mich., a corporation of Michigan No Drawing. Application March 9, 1938, Serial No. 194,858

4 Claims. (Cl. 260—666)

The present invention concerns an improved method for preparing cyclohexene. More particularly, it relates to the dehydrohalogenation of a cyclohexyl halide in the presence of an aqueous alkaline agent.

It is known that cyclohexene may be prepared by heating a cyclohexyl halide with quinoline or alcoholic potash or by pyrolyzing such halide at high temperatures. Unfortunately, however, these procedures either require the use of expensive reagents or result in a low yield of impure product and for this reason have never met with commercial acceptance.

We have now discovered that cyclohexene may conveniently be prepared in excellent yield and high purity by heating a cyclohexyl halide with water in the presence of an alkaline agent. The invention, then, consists in the improved method of making cyclohexene hereinafter described and particularly pointed out in the claims.

In carrying out the preparation, one mole of a cyclohexyl halide, e. g. cyclohexyl chloride or bromide, either pure or accompanied by a substantially non-reactive diluent, is heated with an excess, e. g. 2 to 50 moles, of water, preferably in the presence of an alkaline agent, e. g. 0.5 to 2.5 chemical equivalents of sodium hydroxide, lime, etc. In the presence of such alkaline agent, the reaction may be carried out at atmospheric pressure and temperatures between 50° and 100° C. in 5 to 50 hours or under superatmospheric pressure at temperatures of 100° C. to 250° C. in a much shorter time. In addition to the cyclohexene, some cyclohexanol may be formed as by-product during the reaction.

Although a wide variety of alkaline agents may be employed to promote the dehydrohalogenation, for practical reasons it is preferable to use one or more of the common alkalies, e. g. sodium hydroxide, sodium carbonate, or calcium hydroxide. However, other metal oxides, hydroxides, or basic metal carbonates, such as strontium oxide, magnesium hydroxide, lithium carbonate, etc., or other weaker basic compounds, e. g. ammonium hydroxide, calcium carbonate, sodium bicarbonate, bismuth subnitrate, etc., may be employed. In addition to the alkaline agents just mentioned, it is also possible to use non-metallic basic-acting agents which are substantially unreactive with the cyclohexyl halide but which react with the hydrogen chloride liberated during the reaction, e. g. quaternary ammonium hydroxides such as $(CH_3)_4NOH$, etc. The proportion of alkaline agent employed in the reaction is not critical, but in order to obtain the best yield of cyclohexene, it is desirable to use a quantity of base at least equivalent to the cyclohexyl halide.

The reaction is preferably carried out with about 4 to 8 parts by weight of water per part of cyclohexyl halide although other proportions may be employed if desired. However, when less than about 4 parts of water is used, the yield of cyclohexene is materially reduced, and when more than about 8 parts of water is employed the recovery of cyclohexene becomes more difficult. As hereinbefore mentioned, the dehydrohalogenation of a cyclohexyl halide may be carried out at atmospheric pressure and a temperature of 50° to 100° C. However, in order to reduce the reaction time required, we prefer to operate in a suitable closed vessel at a temperature between about 100° C. and about 250° C., preferably between 150° C. and 225° C., and under superatmospheric pressure, e. g. under a pressure at least equal to the combined vapor pressures of the constituents of the reaction mixture at the operating temperature. The optimum reaction temperature within the ranges just given depends upon the particular basic agent employed.

The time required to complete the dehydrohalogenation varies from a few minutes to several hours, depending upon the temperature at which the reaction is carried out, the kind and proportion of alkaline agent employed, etc. The completeness of the hydrolysis may readily be determined at any time by withdrawing an aliquot portion of the reaction liquor and analyzing it for inorganic halide. When inorganic halide is found to have been formed in amount chemically equivalent to the cyclohexyl halide employed, the reaction is complete.

After the reaction is complete, the mixture is cooled and allowed to separate into two layers, viz. an oil layer consisting of nearly pure cyclohexene and an aqueous layer containing inorganic reactants and products. The oil layer may be separated and fractionally distilled to separate cyclohexene in a highly pure form.

The following examples illustrate various ways in which the principle of the invention has been employed, but are not to be construed as limiting the scope thereof.

Example 1

A mixture of 474 grams of cyclohexyl chloride and 2400 grams of an 8 per cent by weight aqueous solution of sodium hydroxide was heated in a closed reactor at a temperature of 200°–250° C. for 30 minutes. The reaction mixture was then cooled, and the oil layer was separated and fractionally distilled, whereby 275 grams of cyclohexene and 29 grams of a higher boiling material, probably cyclohexanol, were obtained.

Example 2

A mixture of 125 grams of cyclohexyl chloride and 840 grams of an 8 per cent by weight sodium carbonate solution was heated in a closed reactor at a temperature of 200° C. for 20 minutes. The reaction mixture was worked up as in Example 1, whereby 77.5 grams of cyclohexene was obtained.

Example 3

A mixture of 237 grams of cyclohexyl chloride, 58.8 grams of lime, and 529 grams of water was heated in a closed reactor at a temperature of 200°–250° C. for 1.5 hours. 152 grams of cyclohexene was obtained.

Example 4

A mixture of 237 grams of cyclohexyl chloride, 105 grams of calcium carbonate, and 945 grams of water was heated in a closed reactor at 200° C. for one hour. 146.5 grams of cyclohexene was obtained.

Other modes of applying the principle of the invention may be employed instead of those hereinbefore described, change being made as regards details in the process, provided the step or steps stated in any of the following claims or the equivalent of such stated step or steps be employed.

We therefore particularly point out and distinctly claim as our invention:

1. The process of preparing cyclohexene which comprises heating 1 part by weight of cyclohexyl chloride with between about 4 and about 8 parts of water in the presence of between about 0.5 and about 2.5 equivalents of an alkaline agent per mole of cyclohexyl chloride at a temperature between about 150° C. and about 225° C. under a pressure at least equal to the combined vapor pressures of the constituents of the reaction mixture at the reaction temperature.

2. A process according to claim 1 in which the alkaline agent is sodium hydroxide.

3. A process according to claim 1 in which the alkaline agent is sodium carbonate.

4. A process according to claim 1 in which the alkaline agent is lime.

EDGAR C. BRITTON.
ROBERT C. DOSSER.
JOHN J. SCULATI.